(No Model.)

T. M. McDONOUGH.
MANURE POUCH.

No. 337,181.  Patented Mar. 2, 1886.

Witnesses
A. A. Connolly
Daniel Scott

Inventor
T. Milner McDonough
By Connolly Bros & McTighe
Atty's

United States Patent Office.

T. MILNER McDONOUGH, OF PITTSBURG, PENNSYLVANIA.

MANURE-POUCH.

SPECIFICATION forming part of Letters Patent No. 337,181, dated March 2, 1886.

Application filed May 13, 1885. Serial No. 165,339. (No model.)

*To all whom it may concern:*

Be it known that I, T. MILNER McDONOUGH, of Pittsburg, in the county of Allegheny and State of Pennsylvania, have invented certain new and useful Improvements in Manure-Pouches; and I do hereby declare that the following is a full, clear, and exact description of the invention, which will enable others skilled in the art to which it appertains to make and use the same, reference being had to the accompanying drawings, which form a part of this specification.

This invention relates to a device for attachment to a horse or mare while in the stall for the purpose of receiving the urine or excrement which may be voided by the animal, and thus prevent any soiling of the floor of the stall.

My invention consists in a manure-pouch comprising a flexible bag having necks adapted for connection by straps with the tail and body of the animal, and having also openings for the admission of excreta and urine, and suitable devices for the attachment of the pouch to the animal, all as hereinafter described and claimed.

Figure 1:
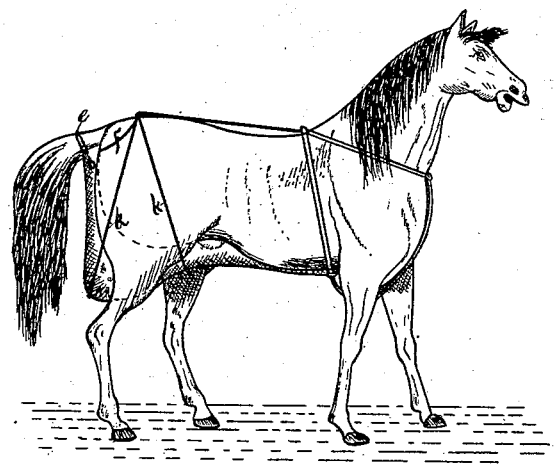
Figure 2:
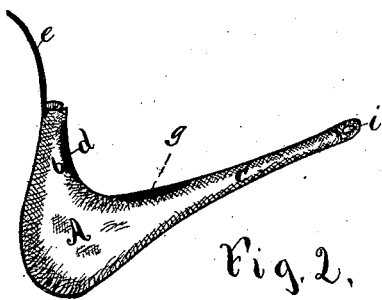

Figure 1 is a view of a horse, showing one mode of attachment of the device. Fig. 2 is a view of the bag detached.

I make the bag preferably of rubber, which can be readily molded to the desired form and size. It consists of the body proper, A, having the upward extension or neck $b$. It is of a somewhat flattened shape, adapting it to occupy the space between the animal's hind legs without giving any discomfort. The neck $b$ rises up to or nearly to the tail, and has an opening, $d$, in its front or upper portion immediately opposite or under the anus of the animal, and may be long enough to extend downwardly to the urinary orifice of a mare, as in Fig. 2. A strap, $e$, serves to attach the upper end of neck $b$ to the animal's tail, and the neck $b$ may also be hooked or otherwise attached to the crupper $f$. By this means, as long as the tail is hanging normally the bag-orifice $d$ is pressed against the animal and practically closed; but when nature calls the first act of the horse is to raise its tail. This acting by the strap $e$ spreads out the neck $b$ and its orifice $d$ and the excrement falls into the bag A. When the tail is lowered, the neck $b$ is practically closed again. The same action takes place in urinating by a mare.

To accommodate the urine for a horse I use the forward extension, $c$, whose shape adapts it to pass forwardly between the horse's hind legs, and has an opening, $g$, in its top adapting it to the entrance of the animal's penis, as shown applied in Fig. 1. I prefer to take the extension $c$ forward as far as the girth, which I pass through a loop, $i$, in the neck $c$ or a strap therefrom. Supporting-straps $k$ may be attached at suitable points, in order to avoid an undue strain on the strap $e$ and crupper, and to maintain the bag against the animal's body. I wish to state, however, that I do not confine the scope of the invention to any particular outline or configuration for the bag A, nor to any particular arrangement of straps or means of attachment, as all these may be obviously modified without departing from the spirit of my invention.

I do not broadly claim as new a manure-pouch capable of attachment to an animal, as I am aware that such a device has been heretofore used.

Having described my invention, I claim—

A manure-pouch consisting of the flexible bag A, having the necks $b$ and $c$ and the openings $d$ and $g$, adapted to permit of the entrance of the excreta and urine, said bag being provided with means for attaching it to an animal, substantially as shown and described.

In testimony that I claim the foregoing as my own I have hereto affixed my signature in presence of two witnesses.

T. MILNER McDONOUGH.

Witnesses:
ALVA A. MOORE,
JNO. F. ATCHESON.